United States Patent
Burge

[11] 3,830,531
[45] Aug. 20, 1974

[54] COUPLING FOR FLEXIBLE TUBES

[75] Inventor: Donald G. Burge, Plainwell, Mich.

[73] Assignee: Parker-Hannifin Corporation, Cleveland, Ohio

[22] Filed: Apr. 9, 1973

[21] Appl. No.: 349,409

[52] U.S. Cl. .............................. 285/239, 285/249
[51] Int. Cl. ............................................. F16l 33/00
[58] Field of Search ............ 285/239, 23, 319, 331, 285/240, 259

[56] References Cited
UNITED STATES PATENTS

| | | |
|---|---|---|
| 1,106,542 | 8/1914 | Buehner ........................... 285/242 X |
| 3,030,130 | 4/1962 | Appleton ........................ 285/257 X |
| 3,227,803 | 1/1966 | Gohs ................................ 285/257 X |
| 3,429,593 | 2/1969 | Seablom ........................... 285/247 |
| 3,493,250 | 2/1970 | Hertel .................................. 285/249 |
| 3,603,912 | 9/1971 | Kelly .............................. 285/249 X |
| 3,685,860 | 8/1972 | Schmidt ............................. 285/249 |

Primary Examiner—Alfred R. Guest
Attorney, Agent, or Firm—John N. Wolfram

[57] ABSTRACT

A coupling for flexible tubes in which the coupling body has a bore to receive the tube and a tubular support that fits inside the tube. The tube is clamped against the support by a sleeve that is radially deformed between the body and a nut. The support at its inner end has a radial flange with circumferentially spaced fingers connected thereto that are doubled back over the support and are yieldably press fitted within the body bore so that the support is normally firmly held within the body but may be removed therefrom without damage to the support or body.

7 Claims, 5 Drawing Figures

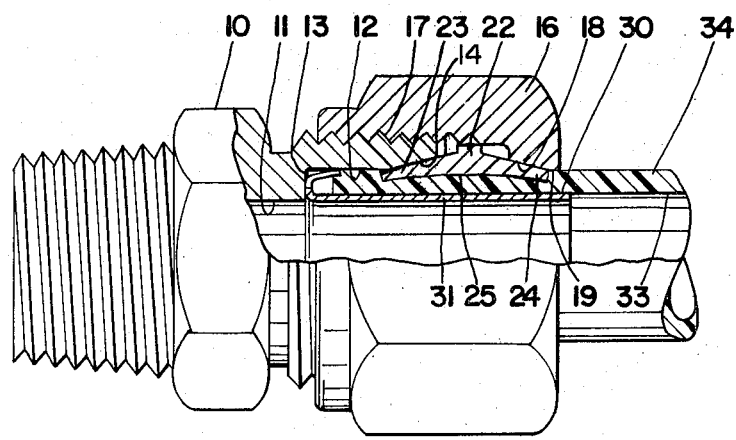
Fig. 1
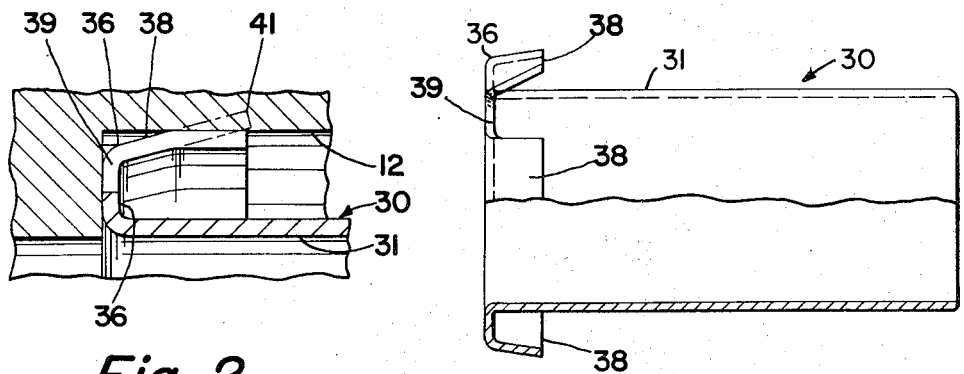
Fig. 2
Fig. 3
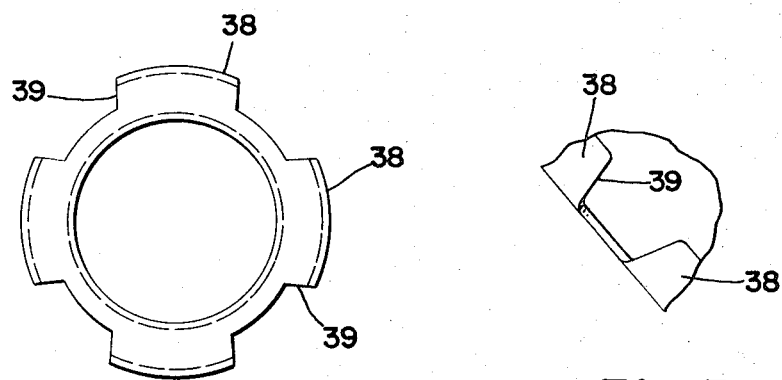
Fig. 4
Fig. 5

3,830,531

COUPLING FOR FLEXIBLE TUBES

BACKGROUND OF THE INVENTION

Plastic tubes of materials such as nylon are coming into wide spread use of various types of fluid handling applications of up to several hundred psi service in sizes of about ¼ inch to 1 inch outside diameter. Such tubes may be readily gripped and sealed at their ends by compression type tube couplings when a rigid tubular support is provided within the end of the tube. Such a coupling is shown, for example, in U.S. Pat. No. 3,493,250.

In couplings off this type, it is desirable that the support be preassembled to the body and held rigidly in place in correct axial alignment with the body bore so as to simplify handling of the coupling parts during storage and installation.

During assembly of the coupling to the tube, the compression sleeve, which is preferably of brass or other metal, is deformed radially inwardly by cam surfaces on the body and nut to embed itself into the tube and tightly clamp the latter against the support. In doing so, the compression sleeve takes a permanent set so that when the nut is disconnected from the body, the sleeve remains locked on the tube and it is extremely difficult to remove the tube from the support. U.S. Letters Patent 3,685,860 provides a coupling of this general type in which the support has a radial flange to serve as an abutment for the end of the tube and has a tubular portion inward of the flange that has a yieldable press fit with a body bore so that the support may be removed from the body after a tube has been clamped thereagainst. However, this inwardly extending press fit portion adds to the pressure drop through the coupling and also requires additional clearance space in bodies with angled bores intersecting the bore in which the support is press fitted.

SUMMARY OF THE INVENTION

The present invention provides a coupling for flexible plastic tubing in which a removable tubular support is mounted in the coupling body. The support has a radial flange at its inner end to butt against a stop shoulder in the coupling body and has circumferentially spaced fingers connected to the flange and doubled back over the support and which are radially yieldable to provide a yieldable press fit within the body bore that receives the tube. The flange has an outer diameter smaller than the body bore so that the entire grip between the body and support is provided by the yieldable fingers so that the support may be assembled and disassembled from the body along with the tube and compression sleeve by sliding the fingers along the bore, but there is enough pressure by the fingers against the bore wall to firmly hold the support in the body in proper axial alignment during storage and handling prior to assembly with a tube.

DETAIL DESCRIPTION

FIG. 1 is a view, partially in longitudinal cross section, of an assembled coupling.

FIG. 2 is an enlarged fragmentary section view showing the press fit connection between the support and body bore.

FIG. 3 is a side view, partly in longitudinal cross section, of the tubular support.

FIG. 4 is an end view of the tubular support.

FIG. 5 is a fragmentary view of the tubular support showing a slot between adjacent fingers.

Thie coupling of FIG. 1 comprises a body 10 having a fluid passage 11 and an enlarged bore 12 with a transverse shoulder 13 at its inner end. At the outer end of bore 12 is a conical flare mouth 14. A nut 16 has a threaded connection at 17 with body 10 and it has a conical cam surface 18 adjacent an opening 19.

Between the nut and body is a metallic compression sleeve 22 with radially deformable inner and outer ends 23, 24. Mounted within body bore 12 is a tubular support 30 that has a tubular insert portion 31 whose outside diameter is approximately the same as the inner diameter 33 of a plastic tube 34.

At its inner end, support 30 has a radial flange 36 and there are a series of generally axially extending fingers 38 connected to the outer margin of flange 36 and doubled back over a part of tubular insert portion 31. Fingers 38 are defined by axially extending slots 39 that preferably pass through flange 36 at a location or diameter between the outer diameter of insert portion 31 and the diameter of the flange at 36 where it connects to the fingers 38. Such slots 39 where they pass through said flange 36 define side edges for said fingers 38 at said flange that are substantially parallel to a radial plane that passes through the longitudinal axis of support 30 and through the circumferential mid-point of the respective finger. The diameter of the flange at 36 is less than the diameter of body bore 12. As shown by full and dotted lines in FIG. 2, the fingers lie in a cone having an included angle of about 16° whereby the initial diameter of the free ends of the fingers at 41 is greater than the diameter of bore 12 so that when support 30 is pressed into bore 12 the free ends of the fingers are radially contracted by bore 12 and engage the bore with a yieldable press fit as indicated by the solid lines in FIG. 2. This press fit is sufficiently tight to retain support 30 in axial alignment with bore 12 during normal handling of the body 10 during storage, shipping and assembly, but is sufficiently yieldable to permit manual disassembly of the support from the body as hereinafter described.

When it is desired to assemble the coupling to a plastic tube, the nut and sleeve are first slipped over the end of the tube, the sleeve bore 24 being initially cylindrical and a few thousandths of an inch larger than the outside diameter of tube 34. The tube end is then slipped over tubular portion 31 of the support and pushed into body bore 12 until it butts against fingers 38. The nut and sleeve are then brought toward the body and the tread on the nut engaged with the thread on the body. Further threading of the nut onto the body causes cam surfaces 14 and 18 in the body and nut to engage the ends 23, 24 of the sleeve and radially compress the latter into sealing and gripping engagement with the tube, as shown in FIG. 1. Because support 30 firmly supports tube 34 against radially inward collapse, the tube becomes firmly clamped against support 30 by ends 23, 24 of the compression sleeve which becomes embedded in the tube and take a permanent set.

To disassemble the coupling, nut 16 is unthreaded from the body and backed along the tube. Because sleeve 22 has taken a permanent set it cannot be moved along the tube and it maintains a tight clamp of the tube against support 30 such that it is extremely difficult to slide the tube off from the support. However, because fingers 38 have a yieldable press fit with bore 12, a firm pull on tube 34 will cause support 30 to slide along bore 12 whereby support 30 and compression sleeve 22 with tube 34 firmly clamped therebetween may be disassembled as a unit from body 10.

Upon release from bore 12, fingers 41 will spring outwardly a small amount so that upon reinsertion of the tube with support 30 and sleeve 22 still assembled thereon into bore 12, the fingers 38 will again have yieldable press fit connection with bore 12. Thus, the coupling may be assembled and disassembled repeatedly even though the support and compression sleeves are, in effect, permanently assembled to the end of the tube.

I claim:

1. A coupling for flexible tubes comprising a body having a bore, a support having a tubular portion receivable within said tube and having a radially outwardly extending flange at its inner end, said flange being connected to a series of circumferentially spaced fingers that extend from said flange generally axially toward the outer end of said tubular portion, said fingers having a yieldable press fit in said bore, and means connected with the body for clamping said tube against said tubular portion.

2. The coupling of claim 1 in which said fingers are defined by axially extending slots that pass through said flange at a location spaced radially outward of said tubular portion.

3. The coupling of claim 1 in which the radially outer surfaces of said fingers initially lie in a cone having its vertex axially inwardly of said flange.

4. The coupling of claim 3 in which said cone has an included angle of about 16°.

5. The coupling of claim 1 in which said bore at its axially inner end terminates in a transverse shoulder, and said flange is engaged with said shoulder.

6. The coupling of claim 1 in which said fingers are defined by axially extending slots that pass through said flange, the side edges of said fingers as defined by said slots at said flange being substantially parallel to a radial plane that passes through the longitudinal axis of the support and through the circumferential mid point of the respective finger.

7. The coupling of claim 1 in which the diameter of the flange at said connection with said fingers is less than the diameter of said bore.

* * * * *